US010157368B2

(12) United States Patent
Schimpf et al.

(10) Patent No.: US 10,157,368 B2
(45) Date of Patent: Dec. 18, 2018

(54) RAPID ACCESS TO DATA ORIENTED WORKFLOWS

(75) Inventors: Brian C. Schimpf, Harvard, MA (US); Edith H. Stern, Yorktown Heights, NY (US); Robert C. Weir, Westford, MA (US); Barry E. Willner, Briarcliff Manor, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2241 days.

(21) Appl. No.: 11/534,681

(22) Filed: Sep. 25, 2006

(65) Prior Publication Data

US 2008/0077465 A1    Mar. 27, 2008

(51) Int. Cl.
*G06Q 10/10* (2012.01)
*G06Q 10/06* (2012.01)

(52) U.S. Cl.
CPC .......... *G06Q 10/10* (2013.01); *G06Q 10/06* (2013.01); *G06Q 10/0633* (2013.01); *G06Q 10/06316* (2013.01)

(58) Field of Classification Search
USPC ...................................... 705/7.11, 7.26, 7.27
See application file for complete search history.

(56) References Cited

U.S. PATENT DOCUMENTS

| | | | |
|---|---|---|---|
| 6,237,099 B1 * | 5/2001 | Kurokawa | G06F 21/604 707/999.009 |
| 6,571,246 B1 | 5/2003 | Anderson et al. | |
| 6,961,901 B1 * | 11/2005 | Colson | G06F 17/30899 707/E17.119 |
| 6,968,503 B1 | 11/2005 | Chang et al. | |
| 7,000,178 B2 * | 2/2006 | Unchida | G06F 17/30707 707/999.006 |
| 7,394,372 B2 | 7/2008 | Gloekler et al. | |
| 7,529,863 B2 * | 5/2009 | MacKay | H04N 1/00204 710/15 |
| 7,562,215 B2 * | 7/2009 | Cummins | 713/165 |
| 2002/0005774 A1 * | 1/2002 | Rudolph | G06F 21/35 340/5.61 |
| 2002/0165882 A1 * | 11/2002 | Zettel et al. | 707/530 |
| 2003/0217034 A1 * | 11/2003 | Shutt | G06F 17/30011 |
| 2004/0044958 A1 * | 3/2004 | Wolf | G06F 17/218 715/255 |
| 2004/0074961 A1 * | 4/2004 | Hull | G06Q 10/10 235/376 |
| 2004/0100363 A1 * | 5/2004 | Lane et al. | 340/5.86 |
| 2004/0119605 A1 | 6/2004 | Schaper | |

(Continued)

OTHER PUBLICATIONS

AbuSafiya, Majed and Masumdar, Subhasish. "Accommodating Paper in Document Databases." DocEng '04 Proceedings of the 2004 ACM Symposium on Document Engineering, Oct. 28-30, 2004 (Hearinafter "AbuSafiya").*

(Continued)

*Primary Examiner* — Renae Feacher
(74) *Attorney, Agent, or Firm* — Cuenot, Forsythe & Kim, LLC

(57) ABSTRACT

One or more RFID tags may be read. An electronic document associated with the RFID tag may be identified. One or more attributes associated with the electronic document can be identified. One or more workflows can be determined according to the attribute(s).

13 Claims, 2 Drawing Sheets

(56) References Cited

U.S. PATENT DOCUMENTS

| | | | |
|---|---|---|---|
| 2004/0125402 A1* | 7/2004 | Kanai et al. | 358/1.15 |
| 2004/0141790 A1 | 7/2004 | Waters | |
| 2004/0222597 A1* | 11/2004 | Benecke | 277/602 |
| 2005/0125402 A1* | 6/2005 | Viola | G06F 17/30011 |
| 2005/0125745 A1* | 6/2005 | Engestrom et al. | 715/847 |
| 2005/0128519 A1* | 6/2005 | Yamauchi | H04N 1/00209 358/1.15 |
| 2005/0143126 A1* | 6/2005 | Chipchase | H04M 1/2755 455/557 |
| 2005/0168766 A1* | 8/2005 | Troyansky et al. | 358/1.14 |
| 2005/0182757 A1 | 8/2005 | Hull et al. | |
| 2005/0198228 A1 | 9/2005 | Bajwa et al. | |
| 2005/0200487 A1* | 9/2005 | O'Donnell | A62B 99/00 340/573.1 |
| 2005/0224571 A1 | 10/2005 | Kelley et al. | |
| 2005/0246341 A1* | 11/2005 | Vuattoux | G06Q 10/10 |
| 2005/0258956 A1 | 11/2005 | Neuwirth | |
| 2005/0262429 A1 | 11/2005 | Elder et al. | |
| 2005/0288952 A1 | 12/2005 | Davis | |
| 2006/0067252 A1* | 3/2006 | John | G06Q 10/06 370/261 |
| 2006/0074933 A1* | 4/2006 | Barac | G06Q 10/06 |
| 2006/0080157 A1* | 4/2006 | Shuker | 705/8 |
| 2006/0080316 A1* | 4/2006 | Gilmore et al. | 707/9 |
| 2006/0108266 A1* | 5/2006 | Bowers et al. | 209/584 |
| 2006/0161990 A1* | 7/2006 | Frey et al. | 726/26 |
| 2006/0184865 A1* | 8/2006 | Chakraborty | 715/500 |
| 2006/0208889 A1* | 9/2006 | Shaffer | G06Q 30/02 340/572.1 |
| 2006/0259326 A1* | 11/2006 | Ambekar et al. | 705/2 |
| 2006/0293085 A1* | 12/2006 | Lauper | 455/558 |
| 2007/0016573 A1* | 1/2007 | Nanavati et al. | 707/5 |
| 2007/0061324 A1* | 3/2007 | Morris | 707/9 |
| 2007/0174693 A1* | 7/2007 | Gerber | 714/15 |
| 2007/0198560 A1* | 8/2007 | Foygel | G06Q 10/10 |
| 2008/0059338 A1* | 3/2008 | Hubbard | G06Q 10/08 705/28 |
| 2008/0114791 A1* | 5/2008 | Takatsu et al. | 707/100 |
| 2008/0120128 A1* | 5/2008 | Berglund et al. | 705/1 |

OTHER PUBLICATIONS

Albany, Carol F. "Defense E-Business Initatives Wide Area Workflow (WAWF)" Defense Contract Management Agency (DCMA), NDIA/DAU RFID Conference, Nov. 4, 2005).*

"Routing Electronic Doments with OneStart Workflow—A White Paper," The Trustees of Indiana University, Oct. 2004.*

Horiguchi et al., "IT-Based Safety and Security Solutions for Schools," Fujitsu Sci, Tech. J., 43, 2, p. 227-235, Apr. 2007.*

"DocRecord, Dynamic Electronic, Document Management," Prism Software Corporation, 2004.* da Silva Dias et al., "Holonic Document: A new Approach to Electronic Document Management," IADIS International Conference WWW/Internet 2007.*

Thumma, Jim, "Accelerating Claim Processing with Automated Workflow," Technology Showcase, Nov. 2006.*

Zhoa, J. et al., "Workflow-Centric Information Distribution Through E-mail," Journal of Management Information Systems/Winter 2000-2001, vol. 17, No. 3m pp. 45-72.*

Abusafiya et al., "Accommodating Paper in Document Databases", ACM DocEng '04, pp. 155-162, Oct. 28-30, 2004.

Gaither et al., "Attaching an RFID Device to Paper During Printing or Receiving a Fax to Allow Tracking Valuable Documents", Research Disclosure, Mason Publications, Hampshire, GB, vol. 499, No. 58, Nov. 2005.

Intensecomp Pte Ltd., Document Tracking System—Using RFID to Track Documents (Dec. 2003).

RFID Journal, "Firewall Protection for Paper Documents", <http://www.rfidjournal.com/article/articleview/790/1/1>, visited Aug. 18, 2005.

Want et al., "Bridging Physical and Virtual Worlds with Electronic Tags", Conference on Human Factors in Computing Systems, Abstract (1999).

Abusafiya et al., "Accommodating Paper in Document Databases", Proceedings of the 2004 ACM Symposium on Document Engineering, Abstract (2004).

Gormish, "Interaction Between Paper and Electronic Documents", Proceedings of the 2005 ACM Symposium on Document Engineering, Abstract (2005).

Gronbaek et al., "'Physical Hypermedia': Organising Collections of Mixed Physical and Digital Material", Proceedings of the Fourteenth ACM Conference on Hypertext and Hypermedia, Aug. 26-30, 2003.

Want et al., "Bridging Physical and Virtual Worlds with Electronic Tags", CHI 99, pp. 370-377, May 15-20, 1999.

Decurtins et al., "Digital Annotation of Printed Documents", CIKM '03, Nov. 3-8, 2003.

Back et al., "Listen Reader: An Electronically Augmented Paper-Based Book", Proceedings of the SIGCHI Conference on Human Factors in Computing Systems (2001).

* cited by examiner

RAPID ACCESS TO DATA ORIENTED WORKFLOWS

BACKGROUND OF THE INVENTION

Modern business processes, also referred to as "workflows", generate a significant amount of information. In the past, much of this information was created and maintained using paper-based systems. As a result, paper documents were often shuffled from one department, or person, to another to accomplish a particular set of tasks, i.e., a workflow. Increasingly, organizations are turning to electronic systems where electronic documents are favored over paper documents. Transferring electronic documents so as to automate, or semi-automate, a workflow usually is easier and more efficient than shuttling the equivalent paper documents between different entities.

Still, many organizations utilize a combination of paper documentation and electronic documentation. Despite the particular reason for using both paper and electronic documents, the co-existence of the two mediums within an organization can result in complex workflows and business practices. Both paper documents, or other physical assets as the case may be, and the electronic documents must be accounted for within the workflows. This accounting may include tracking the physical location of paper documents, limiting the access of selected personnel to paper documents and/or electronic documents, or the like.

BRIEF SUMMARY OF THE INVENTION

The present invention is directed to accessing workflows through the use of radio frequency identification (RFID) technology. One embodiment of the present invention can include a method of accessing workflows. The method can include reading one or more RFID tags. An electronic document associated with the RFID tag can be identified. One or more attributes associated with the electronic document also can be identified. One or more workflows can be determined according to the attribute(s).

One or more parameters for the workflow can be derived from the attribute(s). The workflow further can be initiated. In one aspect, the RFID tag can be attached to, or associated with, a physical asset. In that case, the workflow can implement a security policy relating to the physical asset, the electronic document, or both.

In another aspect, the workflow can establish a communication session between a plurality of participant addresses. The type of communication session to be established, one or more of the plurality of participant addresses, or both can be determined from the attribute(s).

In another aspect, the workflow can include causing an electronic message to be sent to a recipient address. The type of electronic message to be sent, the recipient address or addresses, or both can be determined from the attribute(s).

In another aspect, the workflow can present at least one attribute. In yet another aspect, the workflow can identify one or more calendar events associated with the electronic document and present the calendar event(s).

Determining one or more workflows can include identifying a plurality of workflows, presenting the plurality of workflows, and receiving a user input selecting at least one of the plurality of workflows.

Determining one or more workflows also can include filtering a plurality of workflows from which the workflow is determined according to a further attribute. The further attribute can include, but is not limited to, a date, a current time, a parameter of a user profile, or any combination thereof.

Other embodiments of the present invention can include a system adapted to perform the steps and/or functions disclosed herein as well as a machine readable storage being programmed to cause a machine to perform the various steps and/or functions described herein.

DETAILED DESCRIPTION OF THE INVENTION

Figure 1:
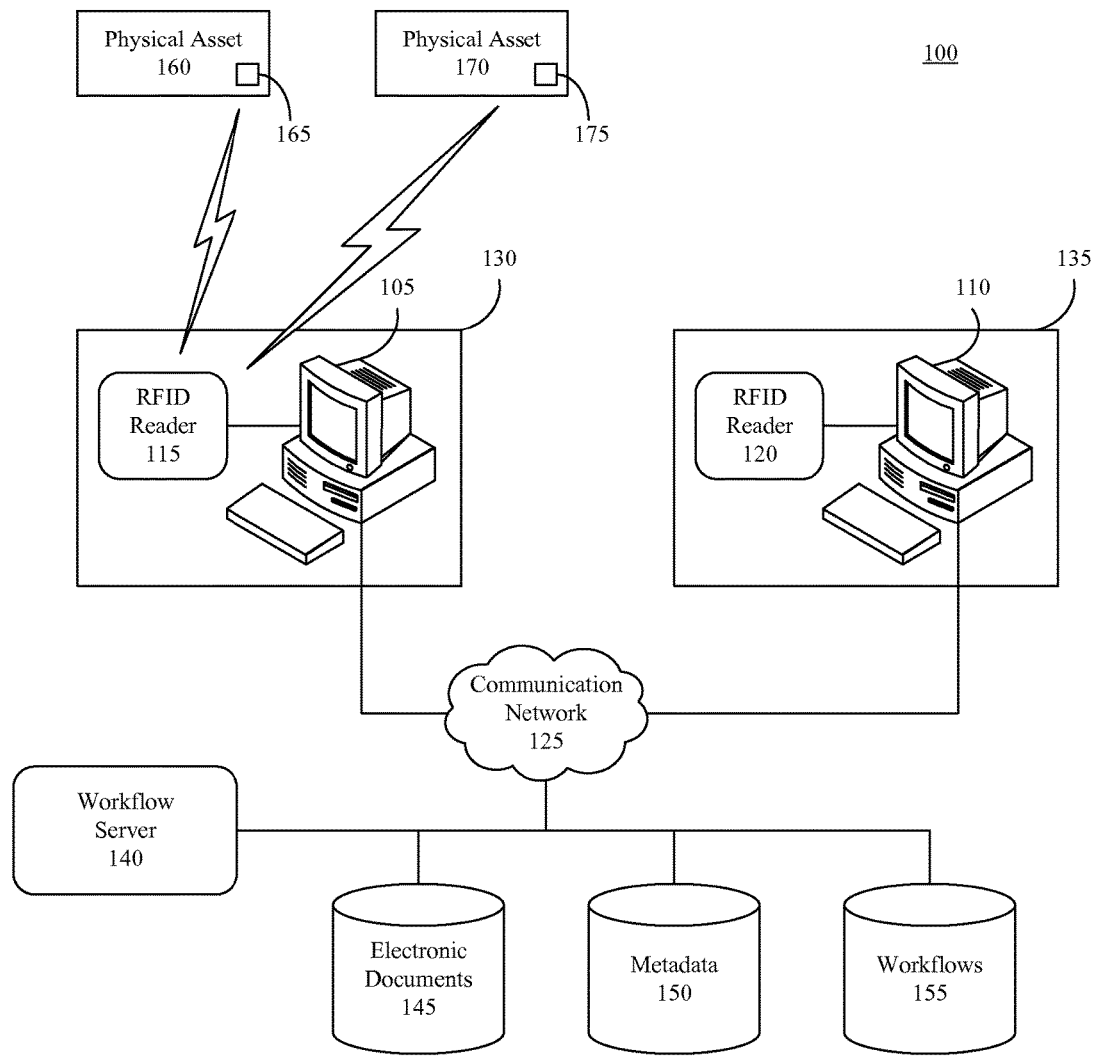
FIG. 1 is a block diagram illustrating a system configured in accordance with one aspect of the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein are directed to the use of radio frequency identification (RFID) technology to access workflows. More particularly, RFID tags, which can be attached to physical assets, can be logically associated with electronic documents. Metadata which provides any of a variety of different attributes or items of information regarding the electronic documents can be stored. Accordingly, when an RFID tag is read, an electronic document can be identified along with the metadata associated with that electronic document. A workflow can be selected, based upon a review of the metadata, and initiated or executed. One or more workflows can be selected by a user or automatically selected and/or filtered based upon the metadata or other attributes to be described herein. Further, the workflow that is selected and initiated can depend upon one or more attributes that are extracted, or obtained, from the metadata.

FIG. 1 is a block diagram illustrating a system 100 that is useful for understanding the embodiments disclosed herein. In accordance with the inventive arrangements, the system 100 can be configured to access and implement workflows through the use of RFID technology. As used herein, a "workflow" can refer to a set of one or more tasks or actions that can be performed by any of a variety of different people or systems, where the systems may be software-based and/or hardware-based systems which may integrate with, or be controlled by, software. One example of a product that can create business workflows is IBM® Lotus® Workflow. IBM® Lotus® Workflow is a stand-alone application development tool that functions cooperatively with IBM® Lotus® Domino® and speeds the creation and deployment of workflow-oriented applications. (IBM, Lotus, and Domino are trademarks of International Business Machines Corporation in the United States, other countries, or both). IBM® Lotus® Workflow allows organizations to standardize and streamline time-consuming, people-based activities and track the progress of such activities. This facilitates more consistent performance of workflows with fewer errors as steps of the workflow are predefined and documented.

One example of a workflow is where a particular electronic document is identified, attached to an electronic mail, and sent to one or more designated recipients. Another example of a workflow is where a communication session is established, whether a teleconference, an instant messaging session, a video-conference, or a web-based conference where one or more desktops are shared among the participants.

As shown, the system 100 can include one or more information processing systems (hereafter "computers") 105 and 110. The computers 105 and 110 can be implemented as any of a variety of different computer systems and/or communication devices executing operational software and/or one or more applications capable of implementing the steps and procedures described herein. The computers 105 and 110 can establish a communication link with a communications network 125. The communication link can be a wireless or a wired connection. Further, the computers 105 and 110 can interface with RFID readers 115 and 120, respectively, as shown.

The RFID readers 115 and 120 can read and/or detect RFID tags 165 and/or 175. It should be appreciated that the manner in which the RFID readers 115 and 120 are linked with computers 105 and 110 is not intended to limit the present invention. For example, the RFID readers 115 and 120 can be linked with the computers 105 and 110 as standard peripheral devices, can be integrated directly into, or within, the computers 105 and 110, or can be connected via wireless communication, such as that provided by a Bluetooth connection or other short-range wireless communications scheme. While the RFID tags 165 and 175 can be used as described herein without being attached, incorporated into, or otherwise associated with physical assets, in one arrangement, the RFID tags 165 and 175 are attached or incorporated into physical assets 160 and 170 respectively.

In one embodiment, the RFID tags 165 and 175 can be active tags with an internal power source. In that case, the RFID tags 165 and 175 can emit an RF signal that can be detected by the RFID readers 115 and 120 when the RFID tags 165 and/or 175 are in range of either RFID reader 115 and/or 120. The RFID readers 115 and 120 can process received RF signals from the RFID tags 165 and 175 to accurately determine unique identifying information imprinted or programmed into the RFID tags 165 and/or 175.

In another embodiment, the RFID tags 165 and 175 can be passive devices which can be interrogated by an RF field emitted by the RFID readers 115 and 120. When interrogated, the RFID tags 165 and 175 can become active. The RFID tags 165 and 175 can detect the presence of the field of the RFID reader 115 and/or 120 and subsequently activate to send data. Like their active RFID tag counterparts, passive RFID tags 165 and 175 can communicate with the RFID readers 115 and/or 120 via wireless RF communication links that are not limited to line of sight operation.

The RFID tags 165 and 175 can be attached to physical assets 160 and 170. Each of the RFID tags 165 and 175 can be programmed or imprinted with identifying information that can be associated with, or identify, one or more digital assets, i.e., electronic documents 145, and, if suitably configured, the physical asset to which that RFID tag is attached, i.e., physical assets 160 and/or 170. In one embodiment, the RFID tags 165 and 175 can be programmed or imprinted with additional information associated with the asset as well. For example, such information can include, but is not limited to, the owner assigned to the physical asset, the date the physical asset was created or printed, etc.

In one embodiment, the association of an RFID tag with a physical asset can be direct in that a database can specify information describing the physical asset and associate that information with the identifying information imprinted into the RFID tag disposed upon that physical asset. Thus, for example, the RFID tag 165 can be imprinted with a unique identifier that can be associated with information relating to the physical asset 160. This allows physical asset 160 to be identified when RFID tag 165 is read by either the RFID reader 115 or the RFID reader 120.

In another embodiment, the association of an RFID tag with a physical asset can be indirect. In that case, the RFID tag 165 can be associated with the physical asset 160 by virtue of the fact that the RFID tag 165 is attached to the physical asset 165. In such an embodiment, little or no information regarding the physical asset 160 need be stored. In this embodiment, a store of tags may be maintained and one tag from the store of tags can be assigned to a physical asset when the asset is created or received. For example, a tag may be embedded in a binder clip. When a document is printed, the tag can be associated with the document and the binder clip can be used to hold the document. When the binder clip is read by the RFID reader, the association between the RFID tag and the printout can be made.

The physical assets 160 and 170 can be any physical object to which an RFID tag can be attached. As RFID tags are becoming increasingly small and unobtrusive, the physical assets 160 and 170 can represent virtually any sort of physical object. In one embodiment, the physical assets 160 and 170 can be paper documents. In that case, for example, paper having embedded RFID tags, upon which ink can be applied to print text, images, bar codes, and the like can be used. RFID tags embedded within paper can be programmed prior to information being printed upon the paper or as the information is being printed upon the paper. Printing allows supplemental information, i.e., selected items of the metadata 150, to be applied to the paper and/or RFID tag as the case may be.

Each of the computers 105 and 110 can be located within distinct geographic areas 130 and 135 respectively. In one embodiment, the geographic areas 130 and 135 can be defined by the range of the RFID readers 115 and 120 disposed within each respective geographic area 130 and 135. In another embodiment, the geographic areas 130 and 135 can be different rooms within a building, home, or office. In still another embodiment, the geographic areas 130 and 135 can be more geographically diverse, i.e., located across a city, town, or state. In any case, the RFID reader 115 can be operable within the geographic area 130 and the RFID reader 120 can be operable within the geographic area 135.

The communication network 125 can include, but is not limited to, a WAN, a LAN, the Public Switched Telephone Network (PSTN), the Web, the Internet, and one or more intranets. The communication network 125 further can include one or more wireless networks, whether short or long range. For example, in terms of short range wireless networks, the communication network 125 can include a local wireless network built using Bluetooth, one of the 802.xx wireless communication protocols, or other short range wireless communication protocol. In terms of long range wireless networks, the communication network 125 can include a mobile, cellular, and/or satellite-based wireless network. It should be appreciated, however, that the embodiments disclosed herein are not intended to be limited by the particular type of communication network 125 used.

The communication network 125 can link the computers 105 and 110 with a workflow server 140, a collection of electronic documents 145, metadata 150, as well as a collection of workflows 155. The workflow server 140 can be configured to integrate various applications and systems through data synchronization, message translation, message routing, etc. which can be performed across multiple, different types of systems and/or platforms. The workflow server 140 effectively allows developers to create one or more automated, or semi-automated, workflows which can include tasks to be performed by various systems such as calendaring systems, document management systems, electronic mail systems, instant messaging systems, telephony systems, etc. Accordingly, the workflow server 140 can initiate tasks on one or more of such systems, or perform tasks itself, so that processes can be performed seamlessly.

While the workflow server 140 is depicted as a separate server, it should be appreciated by one skilled in the art that all or part of the function provided by the workflow server 140 can be co-resident within the computer (client) 105 and/or 110. For example, workflows associated with an electronic mail can be featured as a part of the electronic mail client and, therefore, be resident within the computers 105 and/or 110.

In one embodiment, the workflow server 140 can communicate with client software executing on the computers 105 and 110 to process identifying information specified by detected RFID tags and to select a workflow from the workflows 155. When a workflow is selected and implemented, the workflow server 140 can instruct each system involved in the selected workflow to perform the task(s) specified in the order specified, i.e., initiate an electronic mail on the electronic mail system, instruct a telephony system to initiate a conference call, or the like. Final selection of the workflow may involve presenting a choice to the user, and receiving a final selection from the user. For example, if the available workflows include initiating a teleconference call, sending an electronic mail with an attachment, initiating a multi-person chat session, these may be presented to the user as selections. In that case, the user becomes the final arbiter of the workflow that is selected for implementation.

In one embodiment, the workflow server can be implemented as IBM® WebSphere® Business Integration Server (WebSphere is a trademark of International Business Machines Corporation in the United States, other countries, or both). It should be appreciated, however, that the embodiments disclosed herein are not intended to be limited to one particular type of workflow server and that any suitable workflow server, or plurality of systems that, when used together, collectively implement such functionality, can be used. In any case, the workflow server 140 can execute within a suitable information processing system and interface with one or more other systems including, but not limited to, electronic mail systems, telephony systems, instant messaging systems, calendaring systems, document management systems, application servers, and the like (not shown).

In another embodiment, the client software executing on the computers 105 and 110 can interact with an application server (not shown) to implement the steps described herein. The application server can execute one or more applications which utilize or otherwise make selected ones of workflows 155 available. The application server can provide the functionality described herein independently or in combination with the computers 105 and 110 and/or the workflow server 140.

The electronic documents 145 can be disposed within a network accessible storage device. The electronic documents 145 can include, but are not limited to, word processing documents, markup language documents, presentations, electronic mails, instant messages, spreadsheets, audio, video, multimedia files, etc. An electronic document 145 can include any type of digital file or asset.

The metadata 150 also can be included within a network accessible storage device. The metadata 150 can specify various characteristics, parameters, and/or attributes pertaining to the electronic documents 145 and/or the physical assets 160 or 170 to which the metadata 150, or selected items thereof, have been associated. For example, the metadata 150 can specify one or more persons associated with an electronic document 145, i.e., a responsible workgroup or team, a revision history, one or more approvals that an electronic document 145 has received within a given business process, a file name for an electronic document 145 or physical asset, a user-specified file description for an electronic document or physical asset, as well as a revision number.

Other examples of metadata 150 can include, but are not limited to, the identity of creators of electronic documents 145, responsible party(ies), a priority, electronic mail addresses of team members responsible for an electronic document 145, and telephone numbers for the team members. Further examples of metadata also can include associations with ongoing projects, project schedules specifying meeting dates as may be stored within a calendaring system, or the like. Such attributes can be stored on a per electronic document 145 basis such that the metadata 150, or individual items of metadata 150, are associated with specific ones of the electronic documents 145. It should be appreciated that the listing of possible types of metadata 150 is provided for purposes of illustration and is not intended to limit the present invention. In one embodiment, some or all of the metadata also can be written to the RFID tag associated with the physical asset.

The workflows 155 also can be stored within a network accessible storage device. Each of the workflows 155 can specify one or more actions or tasks that can be performed responsive to some triggering event. For example, the workflows 155 can specify that responsive to an event such as the detection of one or more RFID tags 165 or 175 at computer 105, a particular electronic document 145 is to be selected or located, one or more team members responsible for the electronic document as may be specified through metadata 150 are to be identified, that the electronic document 145 is to be attached to an electronic mail that is addressed and sent to the team members, and that a chat session is to be initiated between the team members from computer 105 or 110. Other examples of workflows can include, but are not limited to, implementing a teleconference or an instant messaging session between one or more designated users as specified by the metadata 150.

The electronic documents 145, metadata 150, and workflows 155 can be stored independently of one another, or combined into a single larger data storage device if desired. In one embodiment, all three types of data can be combined into a single database. The database may or may not be stored across multiple storage devices. In any case, the particular manner in which the electronic documents 145, the metadata 150, or the workflows 155 are stored is not intended to limit the present invention.

In operation, when the RFID tag 165 is read by the RFID reader 115, the computer 105, using operational software executing therein, can determine identifying information contained within the RFID tag 165. This information can be provided to the workflow server 140 or one or more other backend systems as described herein which can cross-reference the identifying information with the electronic documents 145, the metadata 150, the workflows 155, and, optionally, a description or other data pertaining to the physical asset 160 that may be obtained from the RFID tag 165.

In one embodiment, the electronic document 145 that is associated with physical asset 160 can be an electronic version of the physical asset 160, i.e., an electronic source from which a paper document was printed. For example, an electronic document can be printed upon paper having an embedded RFID tag, or have a cover sheet having an embedded RFID tag. This, however, need not be the case as the electronic documents 145 can be supplemental documents or any type of electronic document for which a logical association has been established between the electronic document 145 and the RFID tag 165. For example, the electronic document can be an event that is part of an electronic calendar or work-management system.

When the RFID tag 165 is read and identified, the identifying information obtained from the RFID tag 165 can be used to identify or select an electronic document 145 that has been associated with the RFID tag 165. For example, the RFID tag 165 can specify a unique identifier that has been associated with the electronic document 145. In another embodiment, one or more items of the metadata 150 can be programmed into the RFID tag 165 and read. In that case, the metadata 150 read from the RFID tag 165 can be used to identify the electronic document 145 associated with the RFID tag 165.

Having identified an electronic document 145 and associated metadata 150, one or more workflows 155 can be identified according to the metadata 150. One or more of the associated workflows 155 then can be implemented. In one aspect, the metadata 150 associated with a particular electronic document 145 can directly specify the workflow 155 or workflows 155 that are to be initiated or selected for presentation to a user. As noted, a workflow 155 can include one or more programmatic tasks such as sending the electronic document 145 associated with the RFID tag 165 to the electronic mail addresses of the team members specified in the metadata 150 corresponding to the electronic document 145. Another example of a workflow 155 can include automatically establishing a communication session with one or more participants as specified by the metadata 150 associated with the detected RFID tag 165 and corresponding electronic document 145.

Yet another example of a workflow can be one that is used for document handling. In illustration, consider the case where physical assets 160 and 170 are paper documents. Paper document 160 can correspond to one client of an organization while paper document 170 can correspond to a different client. The organization may impose a requirement that documents for these two clients are to remain completely separate. In that case, a workflow can be created that specifies if both documents are detected within a given range of one another, i.e., by a same RFID reader, a warning is to be provided. Thus, if both RFID tags 165 and 175 are detected by a single RFID reader, i.e. RFID reader 115, at the same time, the computer 105 can present a notification that the two physical assets 160 and 170 should be separated from one another and/or that an organizational directive is being violated.

In another example, where more than one RFID tag associated with an electronic document is detected by a particular RFID reader, a particular electronic document 145, or set of electronic documents 145, associated with one RFID tag can be selected. The selection of a particular electronic document 145 can be based upon any of a variety of attributes as may be specified within the metadata 150. For example, when a plurality of RFID tags are detected concurrently, a workflow 155 can be automatically selected and implemented that determines or selects particular electronic documents for processing. Other examples of workflows can include, but are not limited to, determining if one of a plurality of electronic documents is confidential, indicating a measure of urgency associated with an electronic document associated with a detected RFID tag, and, as noted, determining whether physical proximity of RFID tags (or objects associated with such RFID tags) is prohibited by a security policy.

The implementation of a workflow 155 need not be tied to a particular computer or user. That is, if the RFID tag 165 is detected, in one embodiment, the associated workflow 155 can be implemented regardless of the particular user that is logged into that computer, i.e. computer 105. This allows the workflows 155 to be used seamlessly throughout an organization. In another embodiment, however, security measures can be imposed and integrated into the workflow(s) 155. If the electronic documents 145 associated with RFID tag 165 is assigned a security level beyond that of the user logged into computer 105, or if the user is not listed in the metadata 150 associated with the electronic document 145 associated with the RFID tag 165, the workflow can include a security feature that discontinues operation or processing of the electronic document 145.

Similarly, in the event that multiple workflows 155 are identified according to the metadata 150, other information can be used to filter and/or select particular workflows 155. For example, the metadata 150 for a particular electronic document 145 can indicate a plurality of workflows from the workflows 155. Selected ones of the plurality of workflows can pertain to, or be used by, some personnel, i.e., an executive, while other workflows can pertain to, or be more likely to be used by, administrative personnel. In that case, a user having a user profile can be logged into the computer 105 with the RFID reader 115 that detected the RFID tag 165. The electronic document 145 associated with the RFID tag 165 can be identified as well as the metadata 150 associated with the electronic document 145. A plurality of workflows specified by the metadata 150 can be identified.

Prior to taking any action or querying a user to select a particular one of the plurality of workflows, the workflow server 140 can filter the plurality of workflows according to attributes of the user's profile and only make those workflows that are deemed to be relevant to the user, i.e. relevant to the role of executive or administrator, available. Other attributes that can be used to filter available workflows can include, but are not limited to, location of the computer 105, a date, a time, or the like, which are not related to the electronic document or physical asset(s).

Figure 2:
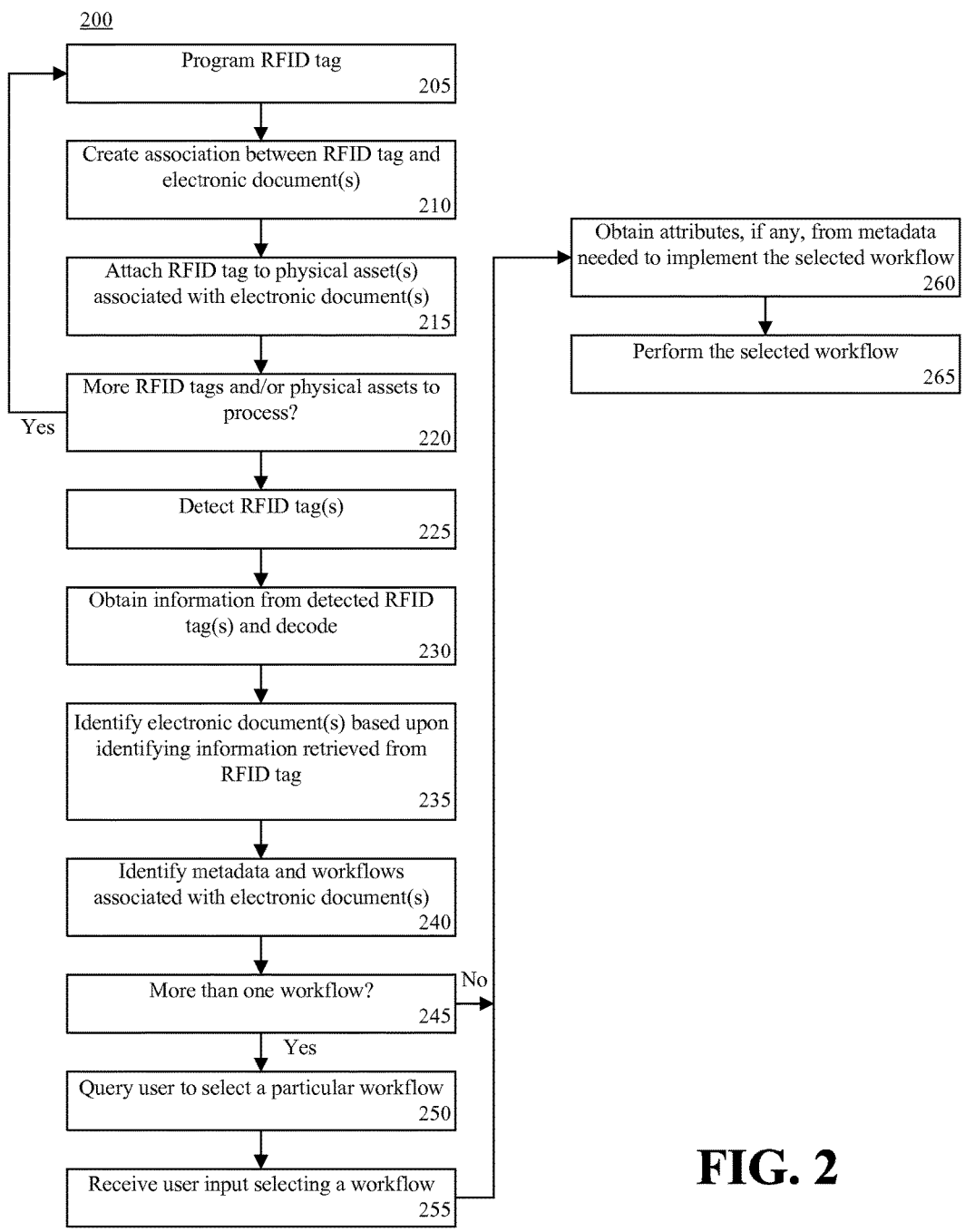
FIG. 2 is a flow chart illustrating a method of implementing workflows using radio frequency identification technology in accordance with another aspect of the present invention.

FIG. 2 is a flow chart illustrating a method 200 of implementing workflows using RFID technology in accordance with another embodiment of the present invention. The method 200 can be implemented by a system such as the one described with reference to FIG. 1. Accordingly, in step 205, an RFID tag can be imprinted or programmed. In one embodiment, the RFID tag can be programmed with a unique identifier. In another embodiment, the RFID tags can be programmed with various items of metadata that, when taken collectively, can uniquely identify a particular electronic document. If the RFID tag is disposed within printable paper, one or more items of metadata further can be printed upon the paper having the RFID tag disposed therein.

Though the step of programming an RFID tag is discussed, in one embodiment, a pool of pre-programmed RFID tags can be maintained. In that case, the RFID tags need not be programmed. When the RFID tags are applied to physical assets, an association between the RFID tags and any related electronic documents and/or metadata can be established or created within the system as described herein in step 210.

In step 210, an association between the RFID tag and one or more electronic documents can be created. For example, within a database or other collection of data specifying the electronic documents, workflows, and/or metadata, the unique identifier of the RFID tag or the items of metadata programmed into the RFID tag can be associated with one or more of the electronic documents. In step 215, the RFID tag can be attached to one or more physical assets, thereby creating an association between the physical assets to which the RFID tag is attached and the electronic documents associated with the RFID tag in step 210. It should be appreciated that, if desired, the RFID tag also can be directly associated with the physical asset to which the RFID tag is attached. In step 220, if more RFID tags and/or physical assets are to be processed, the method can loop back to step 205 to continue processing. Otherwise, the method can continue to step 225.

In step 225, an RFID reader within a system as described herein can detect one or more RFID tags. It should be appreciated that while the method 200 is described with reference to a single RFID reader, the steps described herein can be applied and performed by multiple RFID readers operating concurrently within a system. In one embodiment, the information processing system linked with the RFID reader can continually poll the RFID reader to determine when an RFID tag has been detected. In another embodiment, the RFID reader may be configured to provide a notification to the information processing system such that no polling is necessary. In that case, the information processing system can respond when an event or notification is received from the RFID reader.

In step 230, in the case where at least one RFID tag has been detected by an RFID reader, the information specified by the detected RFID tag(s) can be obtained and decoded, for example, by the RFID reader and/or computer to which the RFID reader is attached or linked. In step 235, the electronic document(s) that were associated with the RFID tag(s) detected in step 225 can be identified. In step 240, metadata and workflow(s) associated with the electronic document(s) identified in step 235 can be determined. In one embodiment a number of standard workflows can be made available. The standard workflows can be customized based upon information associated with the electronic document such as the creators, reviewers, the age of the document, etc. In this embodiment, the customized workflows can be determined in step 235.

In step 245, a determination can be made as to whether more than one workflow has been identified. If not, the method can proceed to step 260. Otherwise the method can continue to step 250, where the system, i.e., the computer to which the RFID reader is attached, can prompt or query a user to select a particular workflow from the plurality of workflows that were identified. For example, the computer can execute suitable operational software which presents the plurality of workflows as a list of selectable workflow items. In step 255, a user input selecting a workflow can be received. In step 260, any attributes from the metadata that are referenced or needed by the selected workflow can be retrieved or read.

In step 265, the workflow can be performed using the attributes from the metadata, if applicable. While a workflow can be performed without reference to metadata, examples of workflow attributes that can be determined from metadata can include, but are not limited to, addresses to which communications are to be directed such as electronic mail addresses, instant messaging addresses, telephone numbers, usernames etc. Other attributes can include the type of communication session to be established such as a telephone call in support of a teleconference, automated voice mail, or facsimile, an instant messaging session, a Web conference, a video conference, or the like. A type of an electronic message to be sent, i.e., an electronic mail, instant message, text message, etc., also can be specified.

In one embodiment, where multiple RFID tags and electronic documents are read and identified, a workflow can be automatically executed that determines one or more of the electronic documents to be processed. Such a workflow, for example, can make the determination by evaluating the priority of an electronic document relative to other electronic documents, disqualifying electronic documents from consideration if a security attribute of an electronic document exceeds the security level of a user associated with the computer that detected the RFID tag, or the like. Still, the workflow can implement or initiate other actions such as implementing a proximity-based security policy, establishing a communication session between participants specified by the metadata using a communication technology or communication session type (i.e., teleconference, instant message, etc.) specified by the metadata, or the like.

In any case, a workflow to be initiated can be specified directly by the metadata for one or more electronic documents and, if desired, executed automatically, selected by a user from a list of workflows specified by the metadata for one or more electronic documents, or selected based upon one or more predetermined rules which analyze the metadata or other supplemental data as described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method comprising:
receiving, by an information processing system comprising a hardware processor, from a radio-frequency identification (RFID) reader, information stored in at least one RFID tag and read from the at least one RFID tag by the RFID reader, the information comprising at least one attribute associated with an electronic document and metadata, the metadata comprising a plurality of instant messaging addresses;
processing, by the information processing system, the at least one attribute associated with the electronic document and, responsive to processing the at least one attribute associated with the electronic document, selecting, by the information processing system, at least one workflow according to the attribute, wherein the workflow is predefined and documented;
identifying, by the information processing system, the plurality of instant messaging addresses and, responsive to identifying the plurality of instant messaging addresses, initiating, by the information processing system, the workflow, initiating the workflow comprising the information processing system initiating a multi-person chat session among the plurality of instant messaging addresses by interfacing with at least one instant messaging system using data synchronization and instructing the at least one instant messaging system to establish the multi-person chat session among the plurality of instant messaging addresses.

2. The method of claim 1, wherein:
the metadata further comprises a plurality of electronic mail addresses;
the method further comprising:
attaching the electronic document to an electronic mail as an attachment and initiating an electronic mail client executing on the information processing system to communicate the electronic mail, with the attachment, to each of the plurality of electronic mail addresses contained in the metadata.

3. The method of claim 1, further comprising:
reading, by the RFID reader, the information stored in the at least one RFID tag.

4. A method comprising:
receiving, by an information processing system comprising a hardware processor, from a radio-frequency identification (RFID) reader, information stored in at least one RFID tag and read from the at least one RFID tag by the RFID reader, the information comprising at least one attribute associated with an electronic document and metadata, the metadata listing at least one user;
processing, by the information processing system, the at least one attribute associated with the electronic document and, responsive to processing the at least one attribute associated with the electronic document, selecting, by the information processing system, at least one workflow according to the attribute, wherein the workflow is predefined and documented; and
processing, by the information processing system, the metadata read from the at least one RFID tag and, responsive to the information processing system processing the metadata, initiating, by the information processing system, the workflow, initiating the workflow comprising the information processing system discontinuing operation or processing of the electronic document when a user is logged into the information processing system, via which the electronic document is being accessed, and the user is not listed in the metadata read from the RFID tag.

5. The method of claim 4, further comprising:
reading, by the RFID reader, the information stored in the at least one RFID tag.

6. An information processing system comprising:
a processor programmed to initiate executable operations comprising:
receiving, from a radio-frequency identification (RFID) reader, information stored in at least one RFID tag and read from the at least one RFID tag by the RFID reader, the information comprising at least one attribute associated with an electronic document and metadata, the metadata comprising a plurality of instant messaging addresses;
processing the at least one attribute associated with the electronic document and, responsive to processing the at least one attribute associated with the electronic document, selecting at least one workflow according to the attribute, wherein the workflow is predefined and documented;

identifying the plurality of instant messaging addresses and, responsive to identifying the plurality of instant messaging addresses, initiating the workflow, initiating the workflow comprising the information processing system initiating a multi-person chat session among the plurality of instant messaging addresses by interfacing with at least one instant messaging system using data synchronization and instructing the at least one instant messaging system to establish the multi-person chat session among the plurality of instant messaging addresses.

7. The information processing system of claim 6, wherein:
the metadata further comprises a plurality of electronic mail addresses;
the executable operations further comprising:
attaching the electronic document to an electronic mail as an attachment and initiating an electronic mail client executing on the information processing system to communicate the electronic mail, with the attachment, to each of the plurality of electronic mail addresses contained in the metadata.

8. The information processing system of claim 6, further comprising:
the RFID reader;
the executable operations further comprising reading, by the RFID reader, the information stored in the at least one RFID tag.

9. An information processing system comprising:
a processor programmed to initiate executable operations comprising:
receiving, from a radio-frequency identification (RFID) reader, information stored in at least one RFID tag and read from the at least one RFID tag by the RFID reader, the information comprising at least one attribute associated with an electronic document and metadata, the metadata listing at least one user;
processing the at least one attribute associated with the electronic document and, responsive to processing the at least one attribute associated with the electronic document, selecting at least one workflow according to the attribute, wherein the workflow is predefined and documented; and
processing the metadata read from the at least one RFID tag and, responsive to the information processing system processing the metadata, initiating, by the information processing system, the workflow, initiating the workflow comprising the information processing system discontinuing operation or processing of the electronic document when a user is logged into the information processing system, via which the electronic document is being accessed, and the user is not listed in the metadata read from the RFID tag.

10. The information processing system of claim 9, further comprising:
the RFID reader;
the executable operations further comprising reading, by the RFID reader, the information stored in the at least one RFID tag.

11. A computer program product comprising a computer readable device, wherein the computer-readable storage device is not a transitory, propagating signal per se, having program code stored thereon, the program code executable by a hardware processor to perform a method comprising:
receiving, by an information processing system comprising the hardware processor, from a radio-frequency identification (RFID) reader, information stored in at least one RFID tag and read from the at least one RFID tag by the RFID reader, the information comprising at least one attribute associated with an electronic document and metadata, the metadata comprising a plurality of instant messaging addresses;

processing, by the hardware processor, the at least one attribute associated with the electronic document and, responsive to processing the at least one attribute associated with the electronic document, selecting, by the hardware processor, at least one workflow according to the attribute, wherein the workflow is predefined and documented;

identifying, by the hardware processor, the plurality of participant electronic mail or instant messaging addresses and, responsive to identifying the plurality of participant electronic mail or instant messaging addresses, initiating, by the hardware processor, the workflow, initiating, by the information processing system, the workflow, initiating the workflow comprising the information processing system initiating a multi-person chat session among the plurality of instant messaging addresses by interfacing with at least one instant messaging system using data synchronization and instructing the at least one instant messaging system to establish the multi-person chat session among the plurality of instant messaging addresses.

12. The computer program product of claim 11, wherein:
the metadata further comprises a plurality of electronic mail addresses;
the method further comprising:
attaching, by the hardware processor, the electronic document to an electronic mail as an attachment and initiating an electronic mail client executing on the information processing system to communicate the electronic mail, with the attachment, to each of the plurality of electronic mail addresses contained in the metadata.

13. The computer program product of claim 11, the method further comprising:
reading, by the RFID reader, the information stored in the at least one RFID tag.

* * * * *